(12) United States Patent
Jung

(10) Patent No.: US 8,500,175 B2
(45) Date of Patent: Aug. 6, 2013

(54) PLASTIC MALE SCREW CONNECTOR USING INJECTION MOLDING

(75) Inventor: Ho Jin Jung, Seoul (KR)

(73) Assignee: Softchem Inc., Seoul (KR)

( * ) Notice: Subject to any disclaimer, the term of this patent is extended or adjusted under 35 U.S.C. 154(b) by 86 days.

(21) Appl. No.: 13/192,663

(22) Filed: Jul. 28, 2011

(65) Prior Publication Data

US 2012/0025519 A1   Feb. 2, 2012

(30) Foreign Application Priority Data

Jul. 28, 2010   (KR) .................. 10-2010-0072981

(51) Int. Cl.
*F16L 25/00*   (2006.01)

(52) U.S. Cl.
USPC ........................................................... 285/386

(58) Field of Classification Search
USPC ................... 285/386, 423, 354, 247
See application file for complete search history.

(56) References Cited

U.S. PATENT DOCUMENTS

| | | | | |
|---|---|---|---|---|
| 2,730,380 A * | 1/1956 | Espy et al. | .................... | 285/354 |
| 2,877,027 A * | 3/1959 | Bagnell | .................... | 285/247 |
| 3,843,169 A * | 10/1974 | Wise | .................... | 285/247 |
| 4,116,477 A * | 9/1978 | Wahoski | .................... | 285/386 |
| 4,848,804 A * | 7/1989 | Weigl | .................... | 285/354 |
| 5,362,109 A * | 11/1994 | Pacht | .................... | 285/354 |
| 7,931,307 B2 * | 4/2011 | Fujii et al. | .................... | 285/247 |

* cited by examiner

*Primary Examiner* — David E Bochna
(74) *Attorney, Agent, or Firm* — Kile Park Reed & Houtteman PLLC

(57) ABSTRACT

A connector is used to connect pipes for conveying a fluid. A plastic male screw connector is manufactured through injection molding of a plastic material to replace a conventional screw connector made of a costly metallic material so that the manufacturing costs can be reduced. Since the screw connector is manufactured through injection molding, mass production of the screw connector becomes possible and the manufacturing costs can be significantly reduced. Also, the plastic material of the screw connector allows for the connector to handle high pressure, resist corrosion and reduce fluid friction.

14 Claims, 4 Drawing Sheets

PLASTIC MALE SCREW CONNECTOR USING INJECTION MOLDING

BACKGROUND OF THE INVENTION

1. Field of the Invention

The present invention relates to a connector used to connect pipes for conveying a fluid, and more particularly, to a plastic male screw connector which is manufactured through injection molding to replace a conventional screw connector made of a costly metallic material with an injecting-molded plastic screw connector so that the manufacturing costs can be reduced.

2. Description of the Related Art

In general, among methods for conveying a fluid, a method of connecting unit pipes and applying a pressure to a fluid so as to convey the fluid to a distant place is most widely used.

In order to connect pipes, connecting methods such as welding, flange coupling, and so forth are used. In this regard, in connecting copper pipes for an air handling unit such as an air conditioner, it is the norm that a connector with threads formed on a connection part is used.

In this way, in the conventional art, in order to connect XL pipes or pipes for an air handling unit, threads are formed on a portion of each pipe so that the pipe can be threadedly assembled by being rotated. However, such a type of connector is vulnerable to a high pressure or a high fluid pressure. Also, in the case where a work space for connecting pipes is narrow, it may be impossible to carry out connection work by rotating the pipes.

In order to solve these problems, research has been conducted for a screw connector with a rotating connection part to allow both pipes to be connected with each other even by not rotating the pipes.

FIG. 1 is an exploded perspective view illustrating the assembling relationship of a conventional screw connector made of a metallic material.

Referring to FIG. 1, a conventional screw connector 1 made of a metallic material includes a body part 10, a rotating connection part 20, a tightening part 30, and a fixed connection part 40, which are assembled with one another.

The body part 10 has a hexagonal bolt head portion 11. A projecting portion 12 is formed on one side of the hexagonal bolt head portion 11, and a large external thread portion 13 and a small external thread portion 14 with a different outer diameter from the large external thread portion 13 are integrally formed on the other side of the hexagonal bolt head portion 11. The projecting portion 12 serves as a portion which is squeezed against and coupled with the rotating connection part 20, and the small external thread portion 14 serves as a portion which is inserted into and threadedly coupled to a pipe. The large external thread portion 13 serves as a portion which is threadedly coupled to the fixed connection part 40.

The rotating connection part 20 is formed on the inner surface thereof with a guide portion (not shown) in the shape of a groove, such that the rotating connection part 20 can be coupled with the projecting portion 12 of the body part 10 while being capable of rotating. Opposite to the guide portion, a thread portion is formed on the inner surface of the rotating connection part 20.

The tightening part 30 is to be placed outside a portion of a pipe which is coupled with the small external thread portion 14. The tightening part 30 functions to tighten once more the pipe coupled with the connector 1 and maintain secure coupling of the connector 1 and the pipe.

The fixed connection part 40 is coupled with the large external thread portion 13, by which the assembly of the connector 1 is completed. In the connector 1, by the rotating function of the rotating connection part 20, interconnection of a shaft and a pipe or interconnection of pipes can be easily implemented without undergoing twisting.

However, the conventional screw connector has a disadvantage in that, since it is made of a metallic material such as copper or stainless steel, it costs high.

An air conditioner for heating and cooling purposes is placed under a higher temperature and a higher pressure than a situation where general pipes are used. Also, in the air conditioner, not a fluid such as water used in a general piping, but a solvent, in which oil capable of being easily vaporized and compressed and with very high chemical reactivity and oil are mixed with the same phase, is frequently used.

If the connector made of a metallic material is used under these conditions, it is difficult to maintain a sealed state due to contraction and expansion characteristics of a metal, and chemical resistance and friction resistance are likely to deteriorate in that fluid flow may be impeded or a pressure load may be induced by corrosion of a connecting portion resulting from the characteristics of a refrigerant used.

SUMMARY OF THE INVENTION

Accordingly, the present invention has been made in an effort to solve the problems occurring in the related art, and an object of the present invention is to provide a plastic male screw connector which is manufactured through injection molding of plastic to replace a screw connector made of a metallic material so that piping work can be easily carried out and the manufacturing costs can be significantly reduced.

In order to achieve the above object, according to one aspect of the present invention, there is provided a male screw connector suitable for connecting pipes, including: a first body part having a body portion, formed with a first external thread portion on one end of the body portion and with a projecting portion on the other end of the body portion, and defined therethrough with a fluid flow path; a second body part formed on one end thereof with a second external thread portion which has an outer diameter larger than the first external thread portion, and on the other end thereof with a first bolt head portion which is fitted around the body portion of the first body part; a rotating connection part having the shape of a nut, formed with a rotation guide portion on an inner surface adjacent to one end thereof such that the projecting portion of the first body part is seated on the rotation guide portion so that the first body part is coupled with the rotating connection part, and with a first internal thread portion on the inner surface thereof, the rotating connection part being capable of rotating; a fixed connection part having the shape of a nut, formed with a second internal thread portion on an inner surface thereof such that the second external thread portion of the second body part is threadedly coupled with the second internal thread portion and a pipe is coupled to one end of the fixed connection part; and a connection part having a second bolt head portion, and formed with a third external thread portion on one side of the second bolt head portion to be threadedly coupled with the first internal thread portion of the rotating connection part and a fourth external thread portion on the other side of the second bolt head portion, wherein the first body part, the second body part, the rotating connection part, the fixed connection part and the connection part are manufactured through injection molding of a plastic material.

In order to achieve the above object, according to one aspect of the present invention, there is provided a male screw connector suitable for connecting pipes, including: a first body part having a body portion, formed with a first external thread portion on one end of the body portion, formed with a projecting portion on the other end of the body portion, and integrally formed with a second external thread portion, a first bolt head portion and a third external thread portion on an extension line of the projecting portion, and defined therethrough with a fluid flow path; a second body part formed on one end thereof with a second external thread portion which has an outer diameter larger than the first external thread portion, and on the other end thereof with a second bolt head portion which is fitted around the body portion of the first body part; a connection joint part having the shape of a nut, formed with a guide portion on an inner surface adjacent to one end thereof such that the projecting portion of the first body part is seated on the guide portion, and with a first internal thread portion on the inner surface thereof to be threadedly coupled with the second external thread portion of the first body part; and a fixed connection part having the shape of a nut, formed with a second internal thread portion on an inner surface thereof such that the fourth external thread portion of the second body part is threadedly coupled with the second internal thread portion and a pipe is coupled to one end of the fixed connection part, wherein the first body part, the second body part, the connection joint part and the fixed connection part are manufactured through injection molding of a plastic material.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
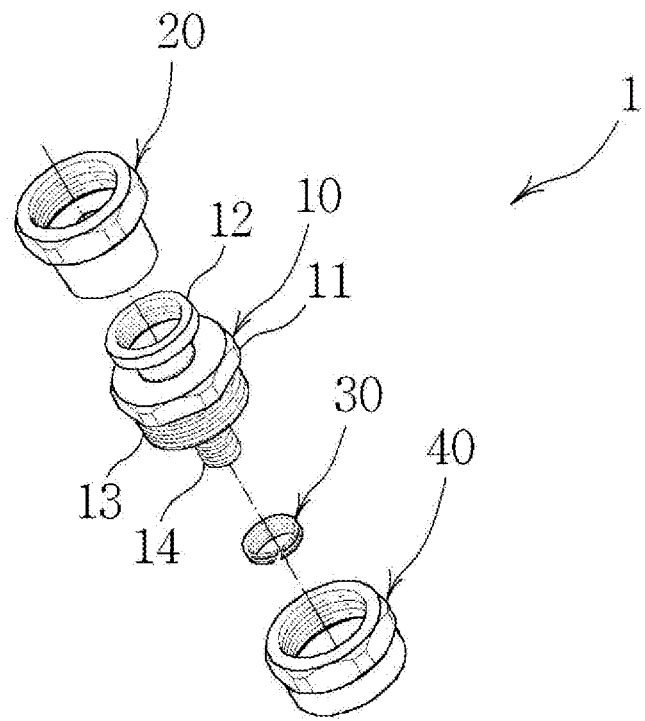
FIG. 1 is an exploded perspective view illustrating the assembling relationship of a conventional screw connector made of a metallic material.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
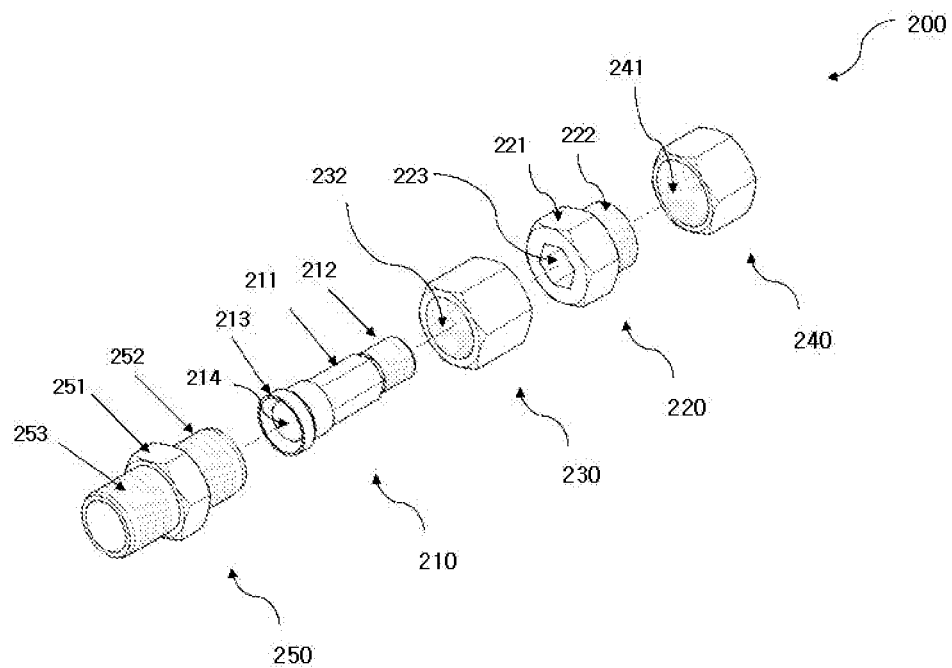
FIG. 2 is an exploded perspective view illustrating the assembling relationship of a plastic male screw connector manufactured through injection molding in accordance with an embodiment of the present invention.

FIG. 2 is an exploded perspective view illustrating the assembling relationship of a plastic male screw connector manufactured through injection molding in accordance with an embodiment of the present invention. Also, FIG. 3 is a perspective view illustrating the assembled state of the plastic male screw connector manufactured through injection molding in accordance with the embodiment of the present invention, and FIG. 4 is a cross-sectional view of FIG. 3.

Figure 3:
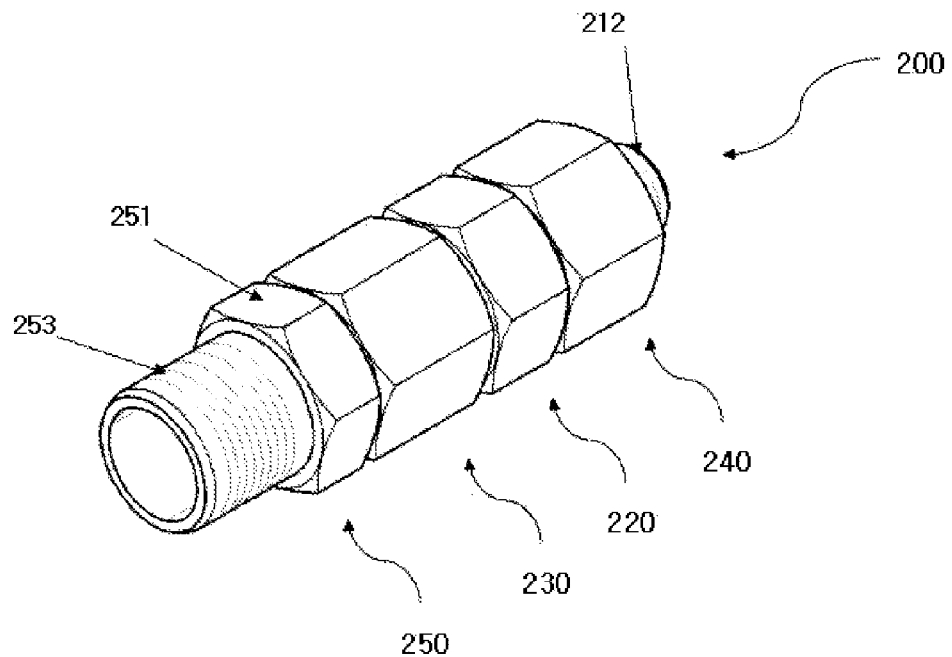
FIG. 3 is a perspective view illustrating the assembled state of the plastic male screw connector manufactured through injection molding in accordance with the embodiment of the present invention.
Figure 4:
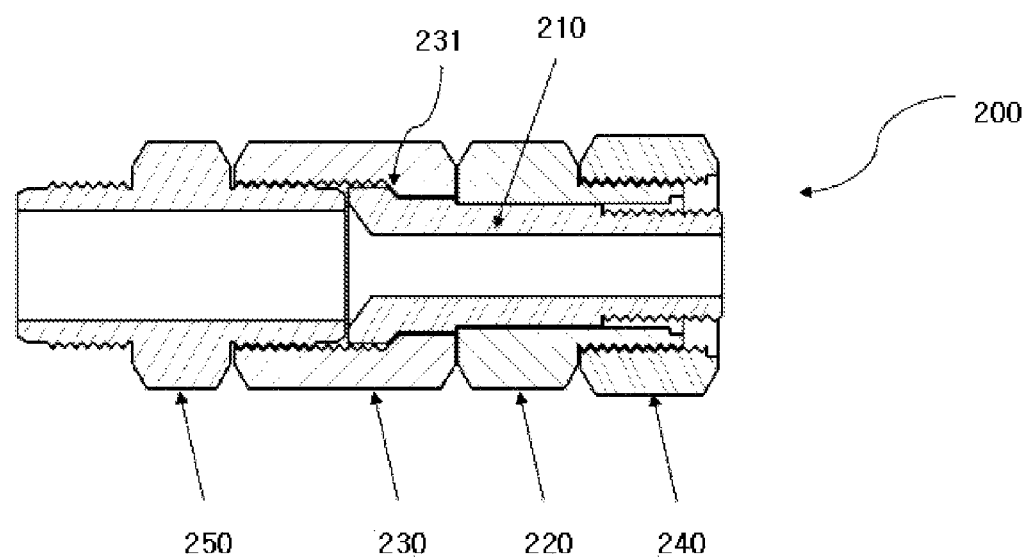
FIG. 4 is a cross-sectional view of FIG. 3.

Referring to FIGS. 2 to 4, a plastic male screw connector 200 manufactured through injection molding in accordance with an embodiment of the present invention includes a first body part 210, a second body part 220, a rotating connection part 230, a fixed connection part 240, and a connection part 250.

The components of the plastic male screw connector 200 manufactured through injection molding in accordance with the embodiment of the present invention, that is, the first body part 210, the second body part 220, the rotating connection part 230, the fixed connection part 240 and the connection part 250 are manufactured through injection molding of a plastic material with a polymer structure which has a high molecular weight.

The key idea of the present invention resides in that a connector is manufactured through injection molding of a polymeric material which can endure a high temperature and a high pressure under conditions such as in an air conditioner for heating and cooling purposes and which does not chemically react with a working fluid with high chemical reactivity or does not have a radical for sharing a reaction group.

That is to say, the plastic male screw connector 200 manufactured through injection molding in accordance with the embodiment of the present invention uses components made of a plastic material with a polymer structure in which a chemical crack does not occur at a high temperature (for example, of 60° C.) and under a high pressure (for example, of 100 kgf/cm$^2$) in a condition where gas, oil, sol and gel are mixed and in which the durability and the mechanical characteristics of a high molecular weight structure do not deteriorate.

In other words, the embodiment of the present invention is characterized in that conventional metallic components are replaced with plastic components with a high molecular weight polymer structure, and due to this fact, constructions of components are varied.

Metallic components can be deformed through pressing or bending when they are machined. However, plastic components cannot be deformed through pressing or bending unlike the metallic components.

Further, it is very difficult to manufacture the structure of the body part 10 shown in FIG. 1 through injection molding. Therefore, in the embodiment of the present invention, as shown in FIG. 2, the construction of a body part is divided into the first body part 210 and the second body part 220 which are manufactured through injection molding.

The first body part 210 has a body portion 211. A first external thread portion 212 is formed on one end of the body portion 211, and a projecting portion 213 is integrally formed on the other end of the body portion 211. A fluid flow path 214 is defined through the first body part 210.

The second body part 220 is formed on one end thereof with a second external thread portion 222 which has an outer diameter larger than the first external thread portion 212, and is formed on the other end thereof with a first bolt head portion 221 which is fitted around the body portion 211 of the first body part 210.

A hole 223 is defined through the second body part 220 such that the first body part 210 can be inserted through the hole 223 to be coupled with the second body part 220. The hole 223 has the same sectional shape as the body portion 211 of the first body part 210, and preferably, is defined to be slightly larger than the size of the body portion 211 so that the body portion 211 can be inserted through the hole 223.

The body portion 211 of the first body part 210 is formed to have a sectional shape of a polygon such as a square, a hexagon or an octagon so that the first body part 210 and the second body part 220 can be securely coupled with each other.

The rotating connection part 230 has the shape of a nut. A rotation guide portion 231 is formed on the inner surface adjacent to one end of the rotating connection part 230 such that the projecting portion 213 of the first body part 210 can be seated on the rotation guide portion 231, by which the first body part 210 can be coupled with the rotating connection part 230. A first internal thread portion 232 is formed on the inner surface of the rotating connection part 230 to be coupled with the connection part 250. The rotating connection part 230 is formed to permit rotation of a pipe when carrying out pipe connection work.

The fixed connection part 240 has also the shape of a nut. A second internal thread portion 241 is formed on the inner surface of the fixed connection part 240 such that the second external thread portion 222 can be threadedly coupled with the second internal thread portion 241 of the fixed connection part 240. A pipe is coupled to one end of the fixed connection part 240.

The connection part 250 has a second bolt head portion 251. A third external thread portion 252 is formed on one side of the second bolt head portion 251 to be threadedly coupled with the first internal thread portion 232, and a fourth external thread portion 253 is formed on the other side of the second bolt head portion 251. The connection part 250 is provided in such a way as to be rotated together with the rotating connection part 230.

The first body part 210, the second body part 220, the rotating connection part 230, the fixed connection part 240 and the connection part 250 are manufactured through injection molding of a plastic material.

The components made of a plastic material are manufactured by adding sulfur atoms into a thermoplastic material based on benzene and grafting and crosslinking a resultant.

It was found that the components made of a plastic material exhibit low molding shrinkage of 0.2%. This represents more stable integrity than the shrinkage of a metal according to a temperature change.

It was found that, when annealing is performed for 4 to 6 hours at a temperature of 200° C. to 250° C. after injection-molding the plastic material, a heat deflection temperature is maintained over 300° C. and a hardness of 120 or over is accomplished. By this fact, it can be appreciated that the components made of the plastic material according to the embodiment of the present invention have excellent heat resistance and a hardness of such a degree as not to be cut by a knife.

The components made of the plastic material, which have these characteristics, exhibit excellent chemical resistance with respect to a working solvent used in an air conditioner and a large strength, and the mechanical characteristics of the components do not deteriorate even at a high temperature.

The plastic male screw connector 200 manufactured through injection molding in accordance with the embodiment of the present invention may further include a tightening part (not shown) which is coupled around the pipe connected to the first external thread portion 212 to firmly couple the pipe to the first external thread portion 212.

The plastic male screw connector 200 manufactured through injection molding in accordance with the embodiment of the present invention is assembled in the following sequence.

First, the first external thread portion 212 of the first body part 210 is inserted through the first internal thread portion 232 of the rotating connection part 230 in such a manner that the projecting portion 213 of the first body part 210 is seated on the rotation guide portion 231 of the rotating connection part 230.

Thereafter, the first bolt head portion 221 of the second body part 220 is fitted around the first external thread portion 212 of the first body part 210 to be coupled with the body portion 211 of the first body part 210. Then, the second body part 220 and the first body part 210 are bonded with each other using an adhesive.

Then, the second internal thread portion 241 of the fixed connection part 240 is threadedly coupled with the second external thread portion 222 of the second body part 220 such that the fixed connection part 240 and the second body part 220 are coupled with each other.

Finally, the third external thread portion 252 of the connection part 250 is inserted into the first internal thread portion 232 of the rotating connection part 230 such that the third external thread portion 252 is threadedly coupled with the first internal thread portion 232 of the rotating connection part 230.

The first bolt head portion 221 of the second body part 220, the second bolt head portion 251 of the connection part 250, the rotating connection part 230 and the fixed connection part 240 are formed to have a sectional shape of a polygon such as a square, a hexagon or an octagon so that pipe connection work can be easily carried out.

Figure 5:
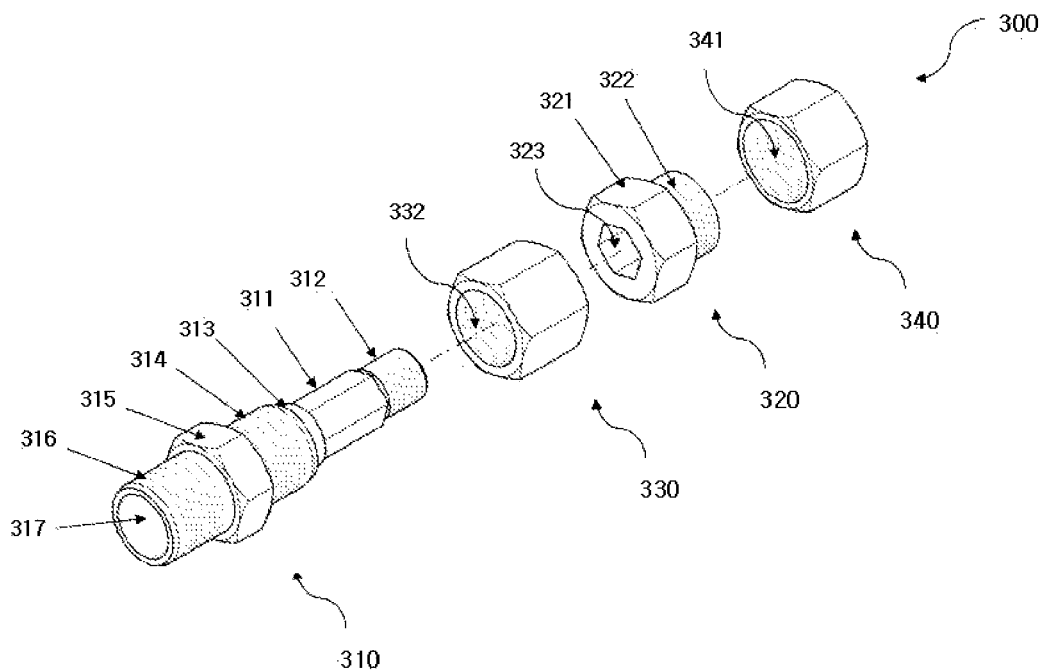
FIG. 5 is an exploded perspective view illustrating the assembling relationship of a plastic male screw connector manufactured through injection molding in accordance with another embodiment of the present invention.

FIG. 5 is an exploded perspective view illustrating the assembling relationship of a plastic male screw connector manufactured through injection molding in accordance with another embodiment of the present invention. Also, FIG. 6 is a perspective view illustrating the assembled state of the plastic male screw connector manufactured through injection molding in accordance with the another embodiment of the present invention, and FIG. 7 is a cross-sectional view of FIG. 6.

Figure 6:
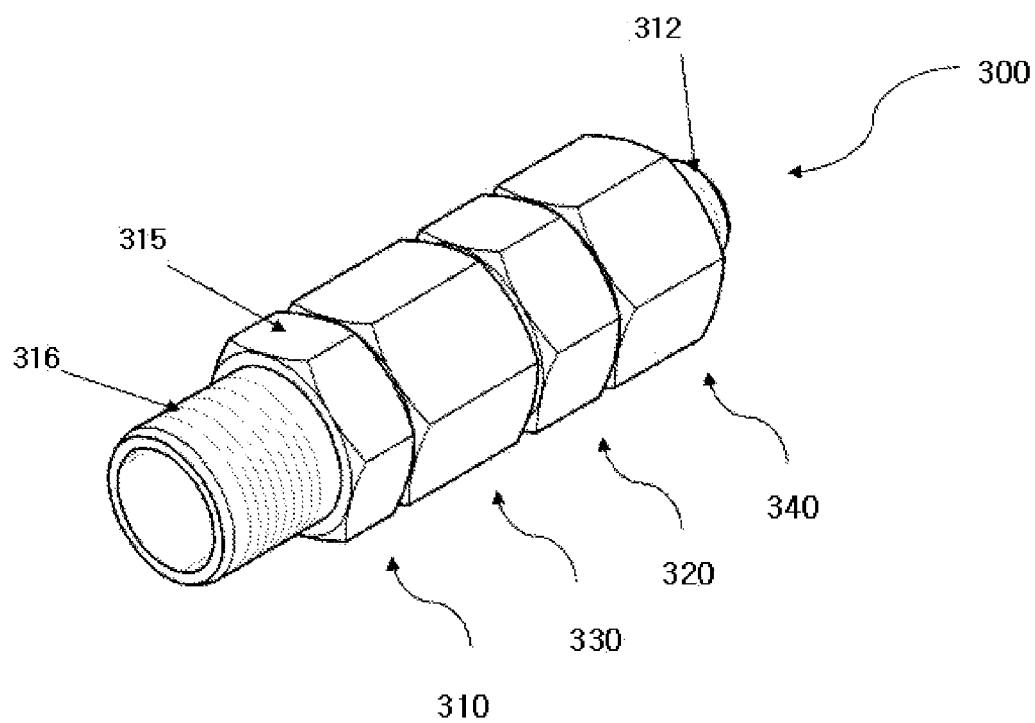
FIG. 6 is a perspective view illustrating the assembled state of the plastic male screw connector manufactured through injection molding in accordance with the another embodiment of the present invention.
Figure 7:
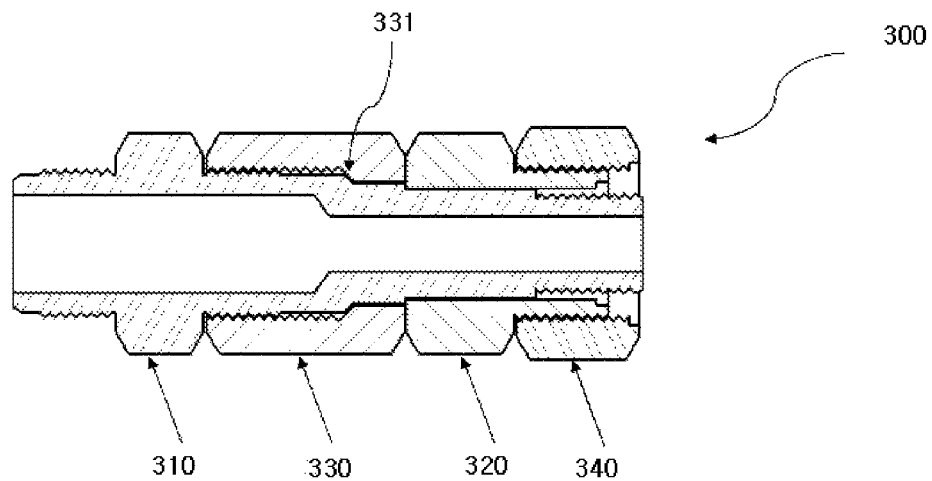
FIG. 7 is a cross-sectional view of FIG. 6.

Referring to FIGS. 5 to 7, a plastic male screw connector 300 manufactured through injection molding in accordance with another embodiment of the present invention includes a first body part 310, a second body part 320, a connection joint part 330 and a fixed connection part 340.

The components of the plastic male screw connector 300 manufactured through injection molding in accordance with the another embodiment of the present invention, that is, the first body part 310, the second body part 320, the connection joint part 330 and the fixed connection part 340 are manufactured through injection molding of a plastic material with a polymer structure which has a high molecular weight.

The first body part 310 has a body portion 311. A first external thread portion 312 is formed on one end of the body portion 311, and a projecting portion 313 is integrally formed on the other end of the body portion 311. A second external thread portion 314, a first bolt head portion 315 and a third external thread portion 316 are integrally formed on the extension line of the projecting portion 313. A fluid flow path 317 is defined through the first body part 310.

The body portion 311 of the first body part 310 is formed to have a sectional shape of a polygon such as a square, a hexagon or an octagon so that the first body part 310 and the second body part 320 can be securely coupled with each other.

The second body part 320 is integrally formed on one end thereof with a fourth external thread portion 322 which has an outer diameter larger than the first external thread portion 312, and is formed on the other end thereof with a second bolt head portion 321 which is fitted around the body portion 311 of the first body part 310.

A hole 323 is defined through the second body part 320 such that the first body part 310 can be inserted through the hole 323 to be coupled with the second body part 320. The hole 323 has the same sectional shape as the body portion 311 of the first body part 310, and preferably, is defined to be slightly larger than the size of the body portion 311 so that the body portion 311 can be inserted through the hole 323.

The connection joint part 330 has the shape of a nut. A guide portion 331 is formed on the inner surface adjacent to one end of the connection joint part 330 such that the projecting portion 313 of the first body part 310 can be seated on the guide portion 331, by which the first body part 310 can be coupled with the connection joint part 330. A first internal thread portion 332 is formed on the inner surface of the connection joint part 330 to be coupled with the second external thread portion 314 of the first body part 310.

The fixed connection part 340 has also the shape of a nut. A second internal thread portion 341 is formed on the inner surface of the fixed connection part 340 such that the fourth external thread portion 322 can be threadedly coupled with the second internal thread portion 341 of the fixed connection part 340. A pipe is coupled to one end of the fixed connection part 340.

The plastic male screw connector 300 manufactured through injection molding in accordance with the another embodiment of the present invention is assembled in the following sequence.

First, the first external thread portion 312 of the first body part 310 is inserted through the first internal thread portion 332 of the connection joint part 330 in such a manner that the second external thread portion 314 of the first body part 310 is threadedly coupled with the first internal thread portion 332 of the connection joint part 330 and the projecting portion 313 of the first body part 310 is seated on the guide portion 331 of the connection joint part 330.

Thereafter, the second bolt head portion 321 of the second body part 320 is fitted around the first external thread portion 312 of the first body part 310 to be coupled with the body portion 311 of the first body part 310. Then, the second body part 320 and the first body part 310 are bonded with each other using an adhesive.

Finally, the second internal thread portion 341 of the fixed connection part 340 is threadedly coupled with the fourth external thread portion 322 of the second body part 320 such that the fixed connection part 340 and the second body part 320 are coupled with each other.

The first bolt head portion 315 of the first body part 310, the second bolt head portion 321 of the second body part 320, the connection joint part 330 and the fixed connection part 340 are formed to have a sectional shape of a polygon such as a square, a hexagon or an octagon so that pipe connection work can be easily carried out.

Figure 8:
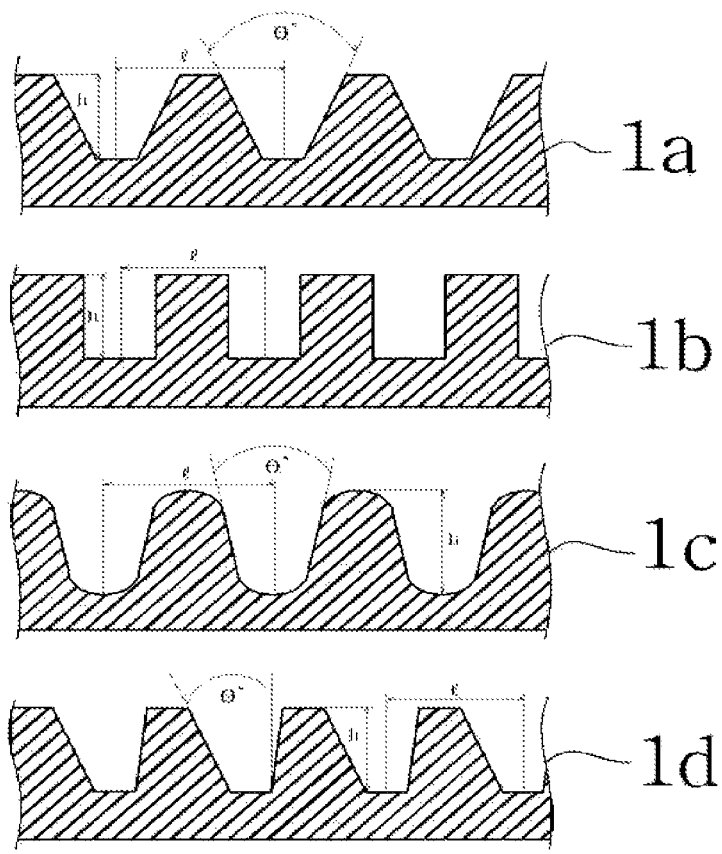
FIG. 8 is of cross-sectional views illustrating several kinds of thread portions of the plastic male screw connector manufactured through injection molding in accordance with the embodiments of the present invention.

FIG. 8 is of cross-sectional views illustrating several kinds of thread portions of the plastic male screw connector manufactured through injection molding in accordance with the embodiments of the present invention.

Referring to FIG. 8, preferably, the first to third external thread portions 212, 214 and 216, the fourth external thread portion 222, the first internal thread portion 232 and the second internal thread portion 241 include any one thread selected among a trapezoidal thread $1a$, a square thread $1b$, a round thread $1c$ and a buttress thread $1d$.

Preferably, the trapezoidal thread $1a$ has a thread angle $\theta$ of 29°~61°, the round thread $1c$ has a thread angle $\theta$ of 29°~31°, and the buttress thread $1d$ has a thread angle $\theta$ of 39°~46°.

Preferably, the trapezoidal thread $1a$, the square thread $1b$, the round thread $1c$ and the buttress thread $1d$ have a distance 1 between roots and a height h in the range of 0.25~6 mm.

The angle $\theta$ of a screw thread means the angle of a helical ridge with a uniform sectional shape, which projects from the surface of a male screw or a female screw. It is preferred that the ranges of the thread angles of the trapezoidal thread $1a$, the round thread $1c$ and the buttress thread $1d$ be maintained since meshing between threads becomes appropriate.

It is preferred that the distance 1 between roots and the height h be maintained in the range of 0.25~6 mm because meshing between threads becomes inappropriate or molding becomes difficult when the distance 1 between roots and the height h go beyond the range of 0.25~6 mm.

As is apparent from the above description, the plastic male screw connector manufactured through injection molding according to the embodiment of the present invention provides advantages in that, since a screw connector for connecting pipes is manufactured through injection molding of a plastic material, mass production of the screw connector becomes possible and the manufacturing costs can be significantly reduced.

Also, because the screw connector is made of the plastic material, excellent pressure resistance with respect to a high pressure, corrosion resistance with respect to a fluid used, and friction resistance can be accomplished.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A male screw connector suitable for connecting pipes, comprising:
    a first body part having a body portion, formed with a first external thread portion on one end of the body portion and with a projecting portion on the other end of the body portion, and defined therethrough with a fluid flow path;
    a second body part formed on one end thereof with a second external thread portion which has an outer diameter larger than the first external thread portion, and on the other end thereof with a first bolt head portion which is fitted around the body portion of the first body part;
    a rotating connection part having the shape of a nut, formed with a rotation guide portion on an inner surface adjacent to one end thereof such that the projecting portion of the first body part is seated on the rotation guide portion so that the first body part is coupled with the rotating connection part, and with a first internal thread portion on the inner surface thereof, the rotating connection part being capable of rotating;
    a fixed connection part having the shape of a nut, formed with a second internal thread portion on an inner surface thereof such that the second external thread portion of the second body part is threadedly coupled with the second internal thread portion and a pipe is coupled to one end of the fixed connection part; and a connection part having a second bolt head portion, and formed with a third external thread portion on one side of the second bolt head portion to be threadedly coupled with the first internal thread portion of the rotating connection part and a fourth external thread portion on the other side of the second bolt head portion, wherein the first body part, the second body part, the rotating connection part, the fixed connection part and the connection part are manufactured through injection molding of a plastic material.

2. The male screw connector according to claim 1, wherein the second body part is defined therethrough with a hole which has a same sectional shape as the body portion of the first body part and such a size that the body portion can be inserted through the hole to be coupled with the second body part.

3. The male screw connector according to claim 2, wherein the male screw connector is assembled in such a manner that the first external thread portion of the first body part is inserted through the first internal thread portion of the rotating connection part so that the projecting portion of the first body part is seated on the rotation guide portion of the rotating connection part, in such a manner that the first bolt head portion of the second body part is fitted around the first external thread portion of the first body part to be coupled with the body portion of the first body part and the second body part and the first body part are bonded with each other, in such a manner that the second internal thread portion of the fixed connection part is threadedly coupled with the second external thread portion of the second body part such that the fixed connection part and the second body part are coupled with each other, and in such a manner that the third external thread portion of the connection part is threadedly coupled with the first internal thread portion of the rotating connection part.

4. The male screw connector according to claim 1, wherein the first body part, the second body part, the rotating connection part, the fixed connection part and the connection part are formed through injection molding of a plastic material with a high molecular weight polymer structure manufactured by adding sulfur atoms into a benzene-based thermoplastic material and crosslinking and annealing a resultant.

5. The male screw connector according to claim 1, wherein the first body part, the second body part, the rotating connection part, the fixed connection part and the connection part are formed through injection molding of a plastic material with a high molecular weight polymer structure manufactured by adding sulfur atoms into a benzene-based thermoplastic material and crosslinking or annealing a resultant.

6. The male screw connector according to claim 1, wherein the first bolt head portion, the second bolt head portion, the rotating connection part and the fixed connection part are formed to have a sectional shape of a polygon.

7. The male screw connector according to claim 1, wherein each of the first to fourth external thread portions and the first and second internal thread portions comprises any one thread selected among a trapezoidal thread, a square thread, a round thread and a buttress thread.

8. A male screw connector suitable for connecting pipes, comprising:

a first body part having a body portion, formed with a first external thread portion on one end of the body portion, formed with a projecting portion on the other end of the body portion, and integrally formed with a second external thread portion, a first bolt head portion and a third external thread portion on an extension line of the projecting portion, and defined therethrough with a fluid flow path;

a second body part formed on one end thereof with a second external thread portion which has an outer diameter larger than the first external thread portion, and on the other end thereof with a second bolt head portion which is fitted around the body portion of the first body part;

a connection joint part having the shape of a nut, formed with a guide portion on an inner surface adjacent to one end thereof such that the projecting portion of the first body part is seated on the guide portion, and with a first internal thread portion on the inner surface thereof to be threadedly coupled with the second external thread portion of the first body part; and a fixed connection part having the shape of a nut, formed with a second internal thread portion on an inner surface thereof such that the fourth external thread portion of the second body part is threadedly coupled with the second internal thread portion and a pipe is coupled to one end of the fixed connection part, wherein the first body part, the second body part, the connection joint part and the fixed connection part are manufactured through injection molding of a plastic material.

9. The male screw connector according to claim 8, wherein the second body part is defined therethrough with a hole which has a same sectional shape as the body portion of the first body part and such a size that the body portion can be inserted through the hole to be coupled with the second body part.

10. The male screw connector according to claim 9, wherein the male screw connector is assembled in such a manner that the first body part is inserted through the first internal thread portion of the connection joint part such that the projecting portion of the first body part is seated on the guide portion of the connection joint part and the second external thread portion of the first body part is threadedly coupled with the first internal thread portion of the connection joint part, in such a manner that the second bolt head portion of the second body part is fitted around the first external thread portion of the first body part to be coupled with the body portion of the first body part and the second body part and the first body part are bonded with each other, and in such a manner that the second internal thread portion of the fixed connection part is threadedly coupled with the fourth external thread portion of the second body part such that the fixed connection part and the second body part are coupled with each other.

11. The male screw connector according to claim 8, wherein the first body part, the second body part, the connection joint part and the fixed connection part are formed through injection molding of a plastic material with a high molecular weight polymer structure manufactured by adding sulfur atoms into a benzene-based thermoplastic material and crosslinking and annealing a resultant.

12. The male screw connector according to claim 8, wherein the first body part, the second body part, the connection joint part and the fixed connection part are formed through injection molding of a plastic material with a high molecular weight polymer structure manufactured by adding sulfur atoms into a benzene-based thermoplastic material and crosslinking or annealing a resultant.

13. The male screw connector according to claim 8, wherein the first bolt head portion, the second bolt head portion, the connection joint part and the fixed connection part are formed to have a sectional shape of a polygon.

14. The male screw connector according to claim 8, wherein each of the first to fourth external thread portions and the first and second internal thread portions comprises any one thread selected among a trapezoidal thread, a square thread, a round thread and a buttress thread.

* * * * *